Patented June 1, 1926.

1,587,073

UNITED STATES PATENT OFFICE.

HANS HAHL, OF ELBERFELD, GERMANY, ASSIGNOR, BY MESNE ASSIGNMENTS, TO WINTHROP CHEMICAL COMPANY, INC., OF NEW YORK, N. Y., A CORPORATION OF NEW YORK.

BASIC PHENOLALKYLETHERS.

No Drawing. Application filed August 22, 1924, Serial No. 733,659, and in Germany September 21, 1923.

I have found that new and valuable pharmaceutical products being basic phenolalkylethers containing an unsaturated side chain can be obtained by treating such cyclic products which are substituted in ortho position to the hydroxyl group which is to be etherified by an unsaturated radicle with an alkaline agent and with basic alkylmonohalides or alkylenedihalides.

The new products are generally colorless or yellowish liquids. They possess a physiological effect upon the uterus and upon the blood vessels causing their contraction. They are therefore valuable substitutes for secale cornutum. They form neutral salts with acids which retain the above defined valuable properties and are soluble in water and can be used for subcutaneous injections.

In order to illustrate the new process more fully the following example is given, the parts being by weight: 1.3 parts of sodium are dissolved in 50 parts of alcohol. This solution is heated until neutral together with 10 parts of 7-allyl-8-hydroxyquinoline and 10 parts of diethylaminochloroethanol. The mixture is poured into water, the oil is separated, dried and distilled.

The 7-allyldiethylaminoethyl-8-oxyquinoline is a yellowish liquid boiling at from 215–217° C. under a pressure of 20 mm. It has most probably the formula:

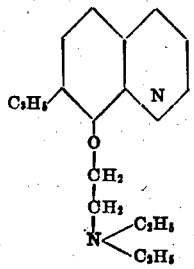

and forms crystallizing salts with acids which salts retain the valuable pharmaceutical properties of the base.

The 1-diethylaminoethyl-6-allylguaiacol has most probably the formula:

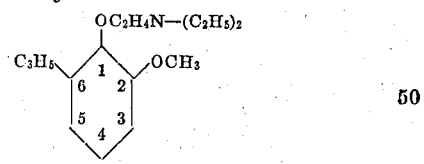

It is a colorless oil boiling at 161–165° C. under a pressure of 12 mm. forming a neutral hydrochloride and sulfate. The diethylaminoethyl-1-allyl-beta-naphthol is a yellowish liquid boiling at from 162–168° C. under a pressure of 10 mm. The 1-diethylaminoethyl-4-6-diallylguaiacol and the 1-dimethylaminoethyl-6-allylguaiacol ether are also liquids forming salts with acids.

2-diethylaminoethyl-3-crotylguajacol is a limpid liquid boiling at 174–178° C. at 12 mm. pressure.

2-dimethylaminoethyl-3-allylguaiacol is a limpid liquid boiling at 152–153° C. under a pressure of 12 mm.

I claim:—

1. As new products the herein described basic phenolalkylethers containing an unsaturated side chain in ortho position to the substituted hydroxyl group of the nucleus being generally oils forming salts with acids, and being valuable substitutes for secale cornutum, substantially as described.

2. As a new product the herein described 1-diethylaminoethyl-6-allylguaiacol being a colorless oil boiling at 161–165° C. under a pressure of 12 mm. and forming a hydrochloride and being a valuable substitute for secale cornutum, substantially as described.

In testimony whereof I have hereunto set my hand.

HANS HAHL.